United States Patent [19]

Bernhardt et al.

[11] Patent Number: 5,348,381
[45] Date of Patent: Sep. 20, 1994

[54] HYDRAULIC BRAKE UNIT WITH ANTI-LOCK AND TRACTION CONTROL SYSTEM FOR MOTOR VEHICLES

[75] Inventors: Wolfgang Bernhardt, Korntal; Guenther Schmidt, Tamm-Hohenstange, both of Fed. Rep. of Germany

[73] Assignee: Robert Bosch GmbH, Stuttgart, Fed. Rep. of Germany

[21] Appl. No.: 117,059

[22] PCT Filed: Jun. 2, 1992

[86] PCT No.: PCT/DE92/00445
§ 371 Date: Sep. 9, 1993
§ 102(e) Date: Sep. 9, 1993

[87] PCT Pub. No.: WO93/00241
PCT Pub. Date: Jan. 7, 1993

[30] Foreign Application Priority Data

Jun. 29, 1991 [DE] Fed. Rep. of Germany ....... 4121602

[51] Int. Cl.$^5$ .............................................. B60T 8/32
[52] U.S. Cl. .............. 303/113.2; 303/116.1
[58] Field of Search ............ 303/113.2, 116.1, 116.2, 303/119.1; 364/426.02, 426.03

[56] References Cited

U.S. PATENT DOCUMENTS 5,156,449 10/1992 Wetzel ........................... 303/113.2
5,207,485 5/1993 Tröster ........................... 303/113.2

FOREIGN PATENT DOCUMENTS 3816073 11/1989 Fed. Rep. of Germany ...... 303/110
4001421 7/1991 Fed. Rep. of Germany .
4011329 10/1991 Fed. Rep. of Germany .
4017874 12/1991 Fed. Rep. of Germany .
0482379 4/1992 Fed. Rep. of Germany .

*Primary Examiner*—Robert J. Oberleitner
*Assistant Examiner*—Peter M. Poon
*Attorney, Agent, or Firm*—Edwin E. Greigg; Ronald E. Greigg

[57] ABSTRACT

A brake unit having a brake line extending between a master brake cylinder and a wheel brake. A changeover valve is included in the brake line on the master brake side and a valve arrangement for the brake pressure modulation is on the wheel brake side. A return line extends from the valve arrangement to a high-pressure pump for feeding a pressure medium into the brake line. Connected to the return line is a storage chamber for the pressure medium taken from the wheel brake. A suction line starts from the brake line on the master brake cylinder side, with a hydraulically switchable check valve connected to the return line. A non-return valve is arranged between the connection of the suction line and the storage chamber. The high-pressure pump can draw pressure media from the master brake cylinder. The entry of the pressure media into the storage chamber from the suction line is prevented by the non-return valve. The hydraulic brake unit is suitable for motor vehicles.

1 Claim, 1 Drawing Sheet

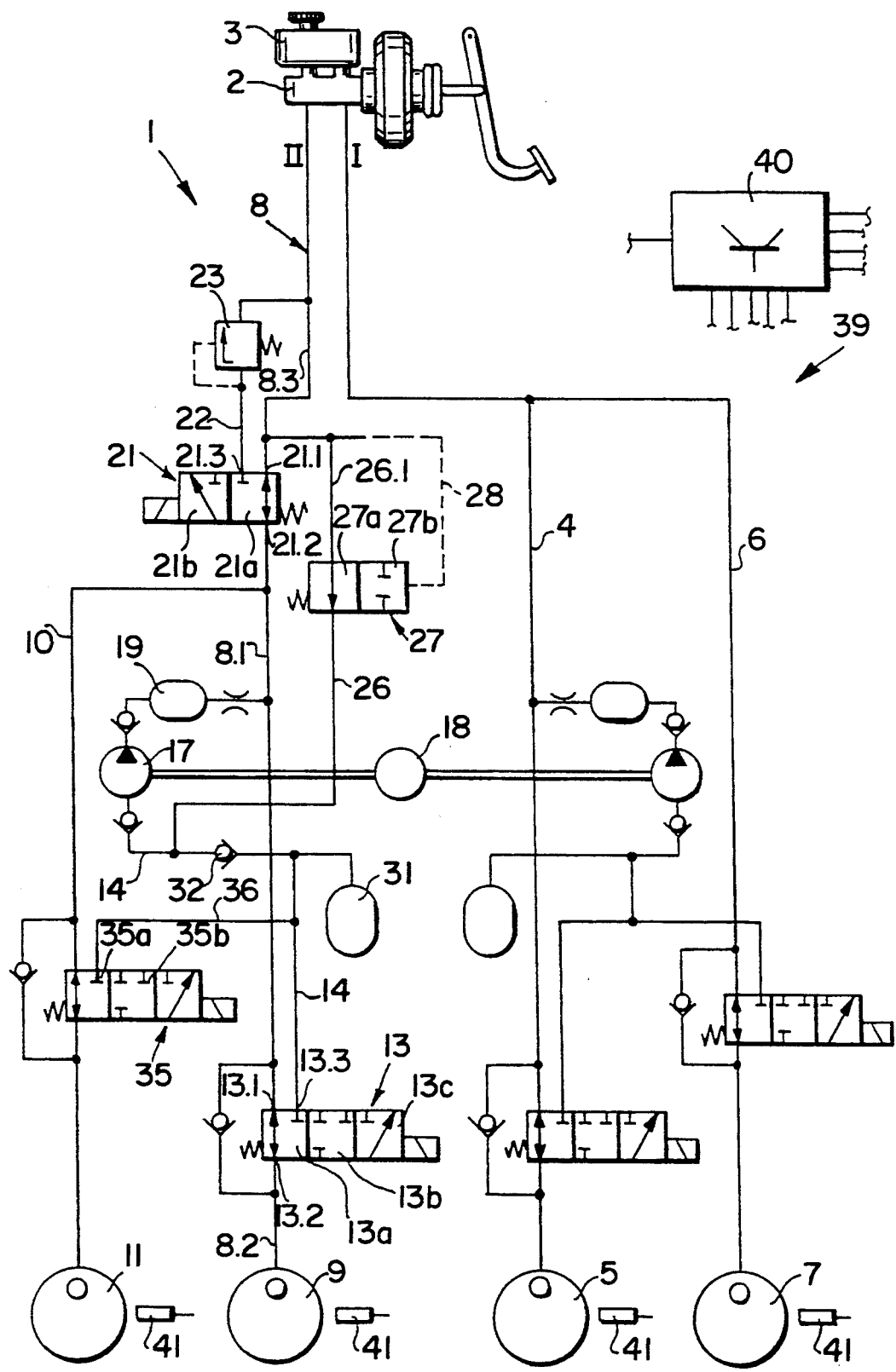

HYDRAULIC BRAKE UNIT WITH ANTI-LOCK AND TRACTION CONTROL SYSTEM FOR MOTOR VEHICLES

PRIOR ART

The invention is based on a hydraulic brake unit with an anti-lock and traction control system for motor vehicles.

Such a brake unit is already known (DE-OS 38 16 073, FIG. 3), U.S. Pat. No. 4,900,102; in which the suction line starts in a brake circuit from a storage vessel for the pressure medium. This is therefore a so-called open brake circuit, in which the pressure medium volume between the master brake cylinder and the wheel brake is subjected to fluctuations, which necessitate additional design measures on the master brake cylinder. Moreover, the suction line, which on the master brake cylinder side takes the form of a hose, is of relatively great length. A hose is more susceptible to assembly faults and risk of damage than is a pipeline. There is moreover the risk that with a leaking check valve or a valve which closes after a delay in the suction line, pressure media will enter into the storage chamber via the return line and reduce its storage volume, in which event during anti-lock or traction control operation, pressure media has to be taken from the wheel brake.

ADVANTAGES OF THE INVENTION

In contrast, the hydraulic brake unit in accordance with the invention has the advantage that the brake circuit is a closed circuit which has a suction line starting from the brake line and an overflow line terminating in the brake line. The suction line can therefore be relatively short and designed as a pipeline or as an integral port. However, the particular advantage is provided by the protection given by the prevention of any pressure media entering into the storage chamber from the suction line side, which is achieved at minor cost. This improves the reliability of the brake unit function and its control behaviour in the anti-lock and traction control operation.

DRAWING

An embodiment example of the invention is shown simplified by means of a schematic diagram for a hydraulic brake unit and is more fully explained in the description which follows.

DESCRIPTION OF THE EMBODIMENT EXAMPLE

The hydraulic brake unit 1 shown in the drawing is intended for use in motor vehicles.

The brake unit 1 has a pedal operated, dual-circuit master brake cylinder 2 with a pressure medium storage tank 3. In a first brake circuit I of the brake unit 1, a brake line 4 extends between the master brake cylinder 2 and a first wheel brake 5. From the brake line 4, a brake line 6 branches off to a second wheel brake 7 of the brake circuit I. The wheel brakes 5 and 7 are assigned to the non-driven front axle of the vehicle. In a second brake circuit II of the brake unit 1, the master brake cylinder 2 is connected with a first wheel brake 9 by means of a brake line 8. A second wheel brake 11 is connected to a brake line 10, which branches off from the brake line 8, of the brake circuit II. The two wheel brakes 9 and 11 of this brake circuit II are assigned to the driven rear axle of the vehicle. The brake circuit II, which has a relationship with the solution provided in accordance with the invention, is described more fully as follows:

A valve arrangement 13 for the brake pressure modulation of the wheel brake 9 is located in the brake line 8 on the wheel brake side. The valve arrangement 13 is designed as a 3/3-way valve and has three connections: A first connection 13.1 is coupled to the section 8.1 of the brake line 8 on the master brake cylinder side, coupled to the second connection 13.2 is the section 8.2 of the brake line 8 on the wheel brake side, while a return line 14 for pressure media taken from the wheel brake 9 starts from a third connection 13.3. The valve arrangement 13 has a first, spring actuated position 13a, in which the two connections 13.1 and 13.2 are linked with each other. In a second position 13b, which is electromagnetically switchable, all three connections 13.1, 13.2, 13.3 are blocked. In a third position 13c, which is also electromagnetically switchable, the second connection 13.2 and the third connection 13.3 are linked with each other.

The return line 14 which starts from the valve arrangement 13, ends at the suction side of a self-priming high-pressure pump 17, which can be driven by an electric drive motor 18. A feed line 19 starts from the high-pressure pump 17 on the pressure side, which is connected to the brake line 8 between the master brake cylinder 2 and the valve arrangement 13.

A change-over valve 21 in the form of a 3/2-way valve is arranged in the brake line 8, between the two connections of the feed line 19 and the brake line 10 to the brake line 8, and the master brake cylinder 2. The changeover valve 21 has three connections: A first connection 21.1 is linked to a section 8.3 of the brake line 8 on the master brake cylinder side; the section 8.1 of the brake line starts from a second connection 21.2; an overflow line 22 which has a pressure limiting valve 23 arranged within, is connected to a third connection 21.3 of the changeover valve 21. The overflow line 22 terminates on the master brake cylinder side in the brake line 8. In a first spring actuated position 21a of the changeover valve 21, the connections 21.1 and 21.2 are linked to each other; in a second electromagnetically operated position 21b, the connections 21.2 and 21.3 are linked to each other.

A suction line 26 starts from the section 8.3 of the brake line 8 between the master brake cylinder 2 and the changeover valve 21, which terminates in the return line 14. A check valve 27 in the form of a 2/2-way valve is the suction line 26. From a section 26.1 of the suction line 26 on the master brake cylinder side, a control line 28 leads to the check valve 27. The check valve 27 has a spring actuated opening position 27a and a blocking position 27b which is switchable by pressure in the section 8.3 of the brake line 8, between the master brake cylinder 2 and the changeover valve 21.

A low pressure storage chamber 31 for pressure media is connected to the return line 14 between the valve arrangement 13 and the connection of the suction line 26. In addition, the return line 14 has a non-return one-way valve 32 arranged between the connection of the suction line 26 and the storage chamber 31, this valve blocks in the direction from the high pressure pump 17 to the valve arrangement 13.

In the same way as in the brake line 8, the brake line 10 has a valve arrangement 35 for the brake pressure modulation in the wheel brake 11. A return line 36 also starts from the valve arrangement 35 which is designed in the same way, this return line terminates between the valve arrangement 13 and the non-return valve 32 in the return line 14.

The elements of the brake unit 1 arranged between the master brake cylinder 2 and the wheel brakes 5, 7, 9, 11 form an anti-lock and traction control system 39 which incorporates an electronic control unit 40 and wheel speed sensors 41 assigned to the vehicle wheels. In the control unit 40, signals of the wheel speed sensors 41 which sense the rotating behaviour of the vehicle wheels can be evaluated, and as the risk of locking occurs on at least one of the vehicle wheels, or with inadmissibly large drive slip on at least one of the two driving wheels of the vehicle, these signals can be converted, by virtue of control algorithms stored in the control unit, into switching signals for the drive motor 18 and of the various electromagnetically operated valves of the brake unit 1.

The hydraulic brake unit 1 has the following functions:

In a braking operation initiated by the vehicle driver, during which the valves of the brake unit 1 adopt the position shown in the drawing, pressure is generated by actuation of the master brake cylinder, and by shifting volumes of pressure medium in the brake lines 4, 6 of the brake circuit I and in the brake lines 8, 10 of the brake circuit II, this acts as braking pressure in the wheel brakes 5, 7, 9, 11. During this action, the pressure prevailing in the brake line 8 between the master brake cylinder 2 and the changeover valve 21 effects the changeover of the check valve 27 into the blocking position 27b. Flow-out of part volumes of pressure medium to the high-pressure pump 17 is thus prevented. If during a brake actuation with a very steep pressure rise, pressure medium should flow through the check valve 27 until this valve switches, then the non-return valve 32 in the return line 14 will prevent pressure medium from entering into the storage chamber 31. In addition, the non-return valve 32 protects the storage chamber 31 from filling with pressure medium, if during a driver actuated braking action, the check valve 27 should stick in the open position 27a or if it leaks.

Should, during a driver actuated braking action, the vehicle wheel assigned to the wheel brake 9 threaten to lock, then the electronic control unit 40 will recognize this due to the signals from the wheel speed sensors 41. The control unit 40 will switch the valve arrangement 13 in the brake line 8 into the position 13c, facilitating a braking pressure reduction in the wheel brake 9. The pressure medium then flows from the wheel brake 9 through the return line 14 into the storage chamber 31, from where it is drawn by the high-pressure pump 17, which is switched on, and fed into the brake line 8. The phase of brake pressure reduction is followed by phases for pressure maintenance and pressure build-up in the wheel brake 9. For pressure maintenance, the control unit 40 switches the valve arrangement 13 into the position 13b, for pressure build-up, the valve arrangement 13 is switched into the position 13a. This anti-locking control operation is maintained until the vehicle wheel assigned to the wheel brake 9 shows a stable rotating behaviour.

However, if during vehicle start and acceleration, the driven vehicle wheel assigned to the wheel brake 9 is subjected to inadmissibly large driving slippage, then this will also be recognized by the control unit 40, due to the signals from the wheel speed sensors 41. The control unit 40 switches the changeover valve 21 into the position 21b and sets the high-pressure pump 17 into operation. The high-pressure pump 17 draws pressure medium from the master brake cylinder 2 through the suction line 26 and the section 8.3 of the brake line 8 and feeds this through-the feed line 19 into the section 8.1 of the brake line 8 which extends between the changeover valve 21 and the valve arrangement 13. While the control unit 40 switches the valve arrangement 35 into the blocking position 35b, braking pressure in the wheel brake 9 is built up by the valve arrangement 13 assuming the position 13a. During this traction control operation, phases for pressure maintenance are followed by phases for pressure reduction, during which the valve arrangement 13 assumes the switching positions already mentioned in the anti-locking operation. In such a traction control operation, pressure medium delivered by the high-pressure pump 17 but not accepted by the wheel brake 9 is diverted via the overflow line 22 and the pressure limiting valve 23, which will have been set to a response pressure of, say, 100 bar, into the section 8.3 of the brake line 8 on the master brake cylinder side. Any leak of the pressure limiting valve 23 is of no consequence, since the pressure medium allowed into the brake line section 8.3 is again drawn off by the high-pressure pump 17 and not drawn from the brake circuit II. It is essential for the favourable control behaviour of the brake unit 1 that the storage chamber 31, which is protected against the entry of pressure medium from the suction line 26 by the non-return valve 32, is available without any restriction to accept pressure medium from the wheel brakes in phases of pressure reduction.

If the driver, in such a traction control operation, initiates a braking action on the wheel brake 9 by actuating the master brake cylinder 2, then the control unit 40 will recognize this from the signal of the brake light switch (not shown) or by the signals of the wheel speed sensors 41. The pressure in the brake line 8 effects the changeover of the check valve 27 into the blocking position 27b, so that the high-pressure pump 17 is cut off from the pressure medium supply from the master brake cylinder 2. In addition, the control unit 40 switches the high-pressure pump 17 off, and switches the valve arrangements 13, 35 into their spring actuated position 13a or 35a and switches the changeover valve 21 into the position 21a. The braking pressure generated by the driver can build up in a similar manner as in the wheel brakes 5, 7 of the brake circuit I, and also in the wheel brakes 9, 11 of the brake circuit II.

The foregoing relates to a preferred exemplary embodiment of the invention, it being understood that other variants and embodiments thereof are possible within the spirit and scope of the invention, the latter being defined by the appended claim.

We claim:

1. A hydraulic brake unit (1) with anti-locking and traction control system (39) for motor vehicles including front and rear wheel brakes,
   a master brake cylinder (2), a storage tank 3 on said master cylinder, a brake line (8) connected to said master cylinder, a valve arrangement (13) in said brake line (8) for brake pressure modulation in a wheel brake, extends between said master brake cylinder (2) and at least one wheel brake (9) of a brake circuit (II), a return line (14) runs from the valve arrangement (13) for the pressure medium taken from the wheel brake (9) to the suction side of a high-pressure pump (17), a feed line (19) is connected on the pressure side to the brake line (8) between the master brake cylinder (2) and the valve arrangement (13), between a connection of the feed line (19) and the master brake cylinder (2), a changeover valve (21) is arranged in the brake line (8), an overflow line (22) extends from said changeover valve (21) and includes a pressure limiting valve (23) which terminates on the master brake cylinder side in the brake line (8), the return line (14) has a suction line (26) connected to it for a pressure media with a pressure in the brake line (8) between the master brake cylinder (2) and a check valve (27) in suction line (26) which is switched by the change over valve (21), the return line (14) is connected, between the valve arrangement (13) and the connection of the suction line (26), to a storage chamber (31) for the pressure media, the suction line (26) starts from the brake line (8) between the master brake cylinder (2) and the changeover valve (21), and a non-return valve (32) is arranged in the return line (14) between the connection of the suction line (26) and the storage chamber (31).

* * * * *